(12) United States Patent
Masis et al.

(10) Patent No.: US 11,966,323 B2
(45) Date of Patent: Apr. 23, 2024

(54) TROUBLESHOOTING SOFTWARE SERVICES BASED ON SYSTEM CALLS

(71) Applicant: Red Hat, Inc., Raleigh, NC (US)

(72) Inventors: Alexander Braverman Masis, Raanana (IL); Boaz Shuster, Kfar Saba (IL)

(73) Assignee: RED HAT, INC., Raleigh, NC (US)

( * ) Notice: Subject to any disclaimer, the term of this patent is extended or adjusted under 35 U.S.C. 154(b) by 489 days.

(21) Appl. No.: 17/141,485

(22) Filed: Jan. 5, 2021

(65) Prior Publication Data

US 2022/0214961 A1 Jul. 7, 2022

(51) Int. Cl.
*G06F 11/36* (2006.01)
*G06F 8/65* (2018.01)

(52) U.S. Cl.
CPC ............ *G06F 11/3636* (2013.01); *G06F 8/65* (2013.01)

(58) Field of Classification Search
CPC ................................. G06F 8/65; G06F 11/3636
See application file for complete search history.

(56) References Cited

U.S. PATENT DOCUMENTS

| | | | |
|---|---|---|---|
| 9,552,356 B1 | 1/2017 | Edwards et al. | |
| 10,235,417 B1 | 3/2019 | Sterin et al. | |
| 10,642,676 B2 | 5/2020 | Kirshenbaum et al. | |
| 2010/0100774 A1* | 4/2010 | Ding | G06F 11/3636 |
| | | | 714/E11.029 |
| 2012/0011153 A1* | 1/2012 | Buchanan | G06F 21/552 |
| | | | 707/E17.014 |
| 2014/0122939 A1* | 5/2014 | Devegowda | G06F 11/3636 |
| | | | 714/45 |
| 2015/0261986 A1* | 9/2015 | Ekbatani | H04W 4/029 |
| | | | 340/8.1 |
| 2017/0103221 A1* | 4/2017 | Goel | G06F 11/3636 |
| 2018/0365085 A1 | 12/2018 | Li | |
| 2019/0324831 A1* | 10/2019 | Gu | G06F 11/0775 |

(Continued)

FOREIGN PATENT DOCUMENTS

| | | |
|---|---|---|
| CN | 110032496 A | 7/2019 |
| CN | 110209518 A | 9/2019 |

OTHER PUBLICATIONS

"CloudWatch Logs Insights Adds Cross Log Group Querying," Amazon Web Services, Inc., 2019, https://aws.amazon.com/about-aws/whats-new/2019/07/cloudwatch-logs-insights-adds-cross-log-group-querying/.

(Continued)

*Primary Examiner* — S. Sough
*Assistant Examiner* — Zheng Wei
(74) *Attorney, Agent, or Firm* — Kilpatrick Townsend & Stockton LLP

(57) ABSTRACT

System calls can be used to troubleshoot problems with software services. For example, a system can receive tracing data indicating system calls executed by a group of software services. The system can analyze parameters of the system calls described in the tracing data to identify relationships between the system calls. The system can determine a sequence of system calls between a predefined starting event and a predefined ending event based on the relationships between the system calls. The system can then generate an output to a user indicating the sequence of system calls. The output can be used by the user to troubleshoot a problem associated with executing the plurality of software services.

16 Claims, 5 Drawing Sheets

(56) References Cited

U.S. PATENT DOCUMENTS

2022/0050895 A1\* 2/2022 Yu .......................... G06N 5/022
2022/0108007 A1\* 4/2022 Zatutschne-Marom .....................
G06F 21/52

OTHER PUBLICATIONS

Jia, T., et al., "An Approach for Anomaly Diagnosis Based on Hybrid Graph Model with Logs for Distributed Services," 2017 IEEE 24th International Conference on Web Services, Jun. 25-30, 2017, https://ieeexplore.ieee.org/abstract/document/8029741.

\* cited by examiner

302

```
getsockname(4, {sa_family=AF_INET, sin_port=htons(67004), sin_addr=inet_addr("127.0.0.1")}, [128->16]) = 0
recvfrom(4, "HTTP/1.0 200 OK\r\nServer: SimpleH"..., 102400, 0, NULL, 0) = 184
...
recvfrom(4, "hello world\n", 12, 0, NULL, 0) = 12
...
write(1, "hello world\n", 12, hello world) = 12
```

304

```
accept4(3, {sa_family=AF_INET, sin_port=htons(60074), sin_addr=inet_addr("127.0.0.1")}, [16], SOCK_CLOEXEC) = 4
...
[pid 23318] <...recvfrom resumed>"GET / HTTP/1.1\r\nHost: localhost:"..., 8192, 0, NULL, NULL) = 78
...
[pid 23318] openat(AT_FDCWD, "/tmp/server/index.html", O_RDONLY|O_CLOEXEC) = 5
...
[pid 23318] write(2, "127.0.0.1 - - [06/Sep/2020 19:02"..., 60 127.0.0.1 - - [06/Sep/2020 19:02:12] "GET / HTTP 1.1" 200 - ) = 60
[pid 23318] sendto(4, "HTTP/1.0 200 OK\r\nServer: SimpleH"..., 184, 0, NULL, 0) = 184
[pid 23318] read(5, "hello world\n", 16384) = 12
[pid 23318] read(5, "", 12288) = 0
[pid 23318] sendto(4, "hello world\n", 12, 0, NULL, 0) = 12
```

TROUBLESHOOTING SOFTWARE SERVICES BASED ON SYSTEM CALLS

TECHNICAL FIELD

The present disclosure relates generally to debugging software services. More specifically, but not by way of limitation, this disclosure relates to troubleshooting software services based on system calls.

BACKGROUND

Distributed computing environments have become increasingly popular. Distributed computing environments generally include a group of computing devices (e.g., servers) that can work together to achieve a common objective. Examples of such distributed computing environments can include cloud computing environments, computing clusters, and data grids.

One factor contributing to the popularity of distributed computing environments is the ease with which distributed software applications can be deployed thereon. A distributed software application includes multiple self-contained software services (e.g., microservices or serverless functions) designed to be deployed individually from one another and to communicate with one another for effectuating the overall functionality of the software application. Distributed software applications can provide improvements to scalability, robustness, isolation, and development time as compared to conventional monolithic applications.

BRIEF DESCRIPTION OF THE DRAWINGS

FIG. 3 is an example of tracing data according to one aspect of the present disclosure.

DETAILED DESCRIPTION

Figure 1:
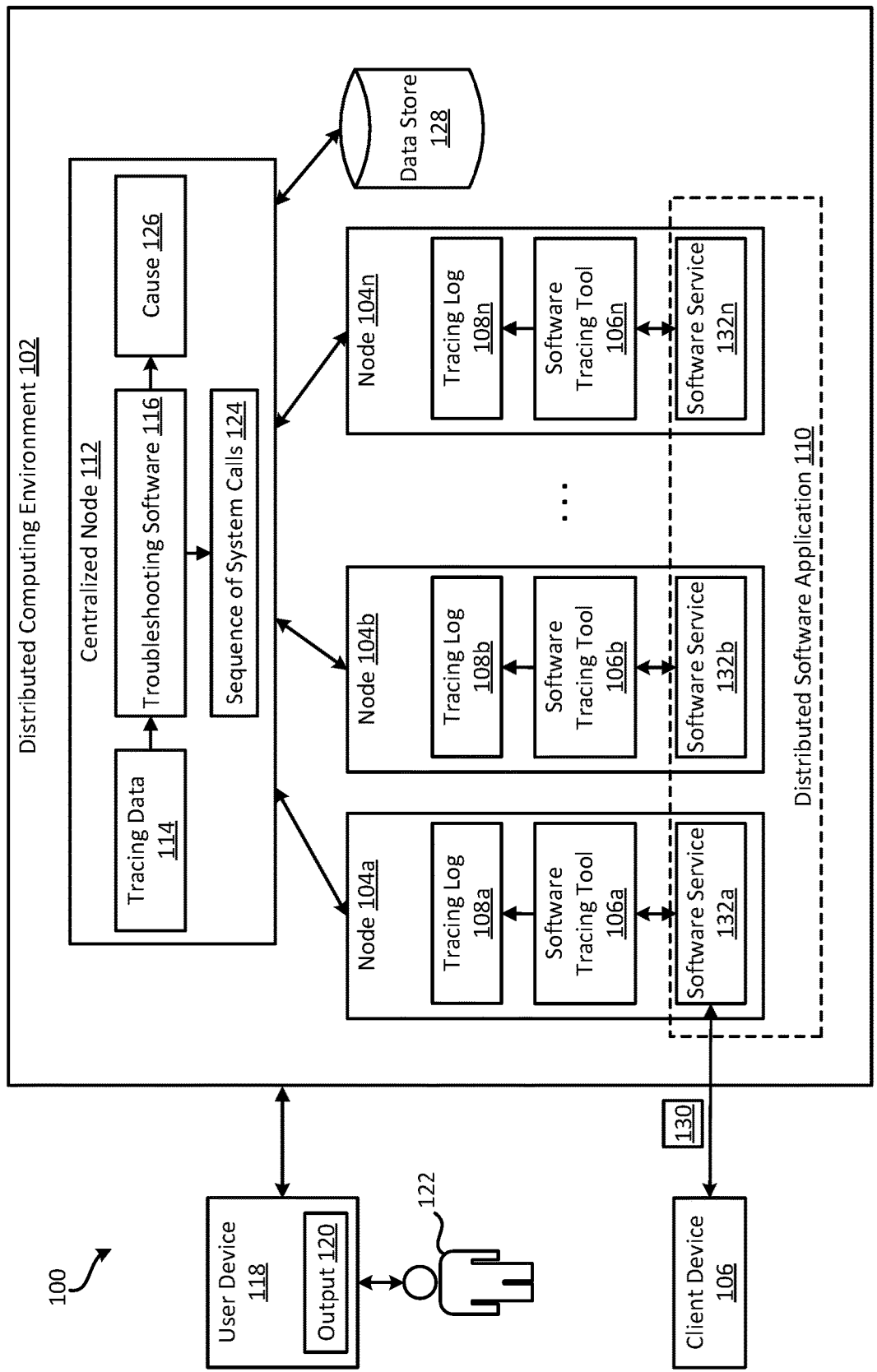
FIG. 1 is a block diagram of an example of a system for troubleshooting software services based on system calls according to some aspects of the present disclosure.

Distributed software applications are becoming increasingly complex. For example, a single distributed software application may rely on dozens or hundreds of individual software services working in concert. The complexity of distributed software applications and the numerous relationships among all of their constituent software services can make it challenging to troubleshoot problems when they arise with respect to said distributed software applications. For example, a client device can interact with a software service of a distributed software application to perform a task. This interaction can trigger a cascading sequence of dozens or hundreds of interactions among a large number of software services to effectuate some or all of the underlying functionality associated with the task. If a problem occurs during this workflow, it can be challenging to troubleshoot the problem given the large number and complexity of the interactions among the software services. This can be particularly true in situations where an administrator charged with maintaining the distributed software application is different from the developer that originally built the distributed software application. For example, an administrator may have to manually analyze thousands of entries in dozens of error logs generated by the software services to identify and follow the sequence of events that led to the problem, which can be time consuming, tedious, subjective, and error prone.

Some examples of the present disclosure can overcome one or more of the abovementioned problems via a system that can analyze tracing data generated by software tracing tools to identify a sequence of system calls made by a group of software services (e.g., of a distributed software application) that led to a problem. A system call can be a programmatic way in which a computer program requests a service from a kernel of an operating system on which the computer program is executed. A problem can be any undesirable event resulting from a defect in a software service. After determining the problematic sequence of system calls, the system can output the sequence of system calls to an administrator, so that the administrator can more easily identify and resolve the problem. Not only can this significantly reduce the troubleshooting burden on the administrator, but it can allow the problem to be resolved faster. Resolving the problem faster can help prevent the problem from being exacerbated or exploited (e.g., if the problem raises a cybersecurity issue).

As one particular example, the system can receive tracing data indicating system calls made by a group of software services in a distributed computing environment. The tracing data can be generated by one or more software tracing tools that are distinct from the software services. The tracing data can include detailed logs about the behavior of the software services during the runtime of the software services. In particular, the tracing data can include entries indicating system calls made by the software services as the software services execute.

In some examples, the tracing data can differ from server logs (e.g., access logs, error logs, and referrer logs) and other types of conventional logs in several ways. For example, the tracing data may be generated by software tracing tools that are distinct from the software services that they are monitoring, whereas conventional logs may be generated by the software services themselves. By keeping the software tracing tools separate from the software services, it may allow some examples described herein to be implemented without having to reprogram or otherwise modify the software services. Additionally, the tracing data specifies system calls made by the software services to an operating-system kernel, whereas conventional logs generally store other types of information such as a history of requests from client devices.

In some examples, the system can receive the tracing data from one or more computing devices hosting the software services. For example, the software services can be deployed on the one or more computing devices along with one or more software-tracing tools, which can generate individual tracing logs for each of the software services. The individual tracing logs can collectively form the tracing data. The system can receive the collection of tracing logs from the one or more computing devices and use the collection of tracing logs as the tracing data.

Having received the tracing data, the system can next analyze the tracing logs to automatically determine a sequence of system calls made by the group of software services that led to a problem. The sequence of system calls can include a set of consecutive system calls that occurred between a predefined starting event and a predefined ending event. The predefined starting event may trigger the sequence of system calls and the predefined ending event may conclude the sequence of system calls. One example of the predefined starting event can be a particular software service in the group of software services receiving a certain type of request from a client device. And one example of the predefined ending event can be an error event associated with the problem. In some examples, the predefined starting event and the predefined ending event can be selected by the administrator.

The system can determine the sequence of system calls based on parameters of the system calls set forth in the tracing data. The parameters can be intrinsic to the system calls and may exclude additional metadata about the system calls, such as timestamps associated with system calls. For example, the system calls can be commands issued by a software service to an operating-system kernal and the parameters can be command parameters, such as a flags, ports, or network addresses (e.g., IP address or URL) forming the commands. By analyzing the parameters of the system calls, temporal relationships among the system calls can be identified. The temporal relationships can be used to determine the sequence of system calls.

Having determined the sequence of system calls, in some examples the system can output the sequence of system calls on a display device, for example as part of a graphical user interface. The administrator can view the sequence of system calls and, based thereon, obtain a better understanding of the workflow that led to the problem. This may help the administrator troubleshoot and resolve the problem.

Additionally or alternatively, the system can automatically determine a cause (e.g., a root cause) of the problem and take steps to help mitigate the problem. For example, the system can analyze the sequence of system calls to determine that a particular software service caused the problem. The system may then notify the administrator of the particular software service that caused the problem, which can further assist the administrator in mitigating the problem. Alternatively, the system can automatically execute one or more operations configured to mitigate the problem. For example, the system can automatically disable, update, and/or reroute network traffic around the particular software service that caused the problem, to prevent the particular software service from continuing to produce the problem.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for troubleshooting software services 132a-n based on system calls according to some aspects of the present disclosure. The system 100 includes a client device 106 in communication with a distributed computing environment 102 via a network, such as the Internet. Examples of the client device 106 can include a laptop computer, desktop computer, mobile phone, tablet, or server. Examples of the distributed computing environment 102 can include a cloud computing environment, a computing cluster, or a data grid.

The distributed computing environment 102 can include a group of nodes 104a-n in communication with each other via a network, such as a local area network. Examples of the nodes 104a-n can be servers or virtual machines. The nodes 104a-n can each execute one or more software services 132a-n. In some examples, the software services 132a-n can collectively form a distributed software application 110. For example, the software services 132a-n can include microservices or serverless functions configured to work together to implement a distributed software application 110, where functional aspects of the distributed software application 110 are spread across the software services 132a-n.

In some examples, the nodes 104a-n can include software tracing tools 106a-b. Examples of the software tracing tool 108 can include Jaeger and DTrace. Although the software tracing tools 106a-b are shown as being separate from the software services 132a-n in FIG. 1, in other examples the software tracing tools 106a-b can be integrated into the software services 132a-n. The software tracing tools 106a-b can monitor the software services 132a-n and generate associated tracing logs 108a-n. For example, the software tracing tools 106a-n can monitor communications between the software services 132a-n and the underlying operating systems of the nodes 104a-n on which the software services are running. One example of such a communication can be a system call from a software service to the operating system. The software tracing tools 106a-n can log the communications (e.g., the system calls) in the tracing logs 108a-n. The tracing logs 108a-n can specify the system calls made by the software services 132a-n while they are executing. In some examples, a tracing log may be specific to an individual software service and only include system calls made by that software service. Alternatively, an individual tracing log may specify system calls made by multiple software services.

After generating the tracing logs 108a-n, some or all of the nodes 104a-n can transmit the tracing logs 108a-n to a centralized node 112. Additionally or alternatively, some or all of the nodes 104a-n can store the tracing logs 108a-n in a data store 128 from which the tracing logs 108a-n can be retrieved by the centralized node 112. An example of the data store 128 can be a distributed storage system such as Ceph Storage. Regardless of the approach, the centralized node 112 can receive (directly or indirectly) the tracing logs 108a-n from the nodes 104a-n. One or more of the tracing logs 108a-n can form tracing data 114.

Having received the tracing data 114, the centralized node 112 can execute troubleshooting software 116 configured to assist a user 122 in troubleshooting a problem associated with the software services 132a-n. The troubleshooting software 116 can analyze the tracing data 114 to determine a sequence of system calls 124 between a predefined starting event and a predefined ending event. The predefined starting event and the predefined ending event may be customized by the user 122. In one particular example, the predefined starting event can involve a software service 132a receiving a request 130 from the client device 106. The request 130 can trigger a cascade of system calls by, and interactions among, some or all of the software services 132a-n. During this workflow, a problem can occur that manifests as an error event, such as a failure of one of the software services 132a-n, where the error event can serve as the predefined ending event. In some such examples, the troubleshooting software 116 can analyze the tracing data 114 to identify the sequence of system calls 124 between the receipt of the request 130 from the client device 106 and the error event.

Figure 2:
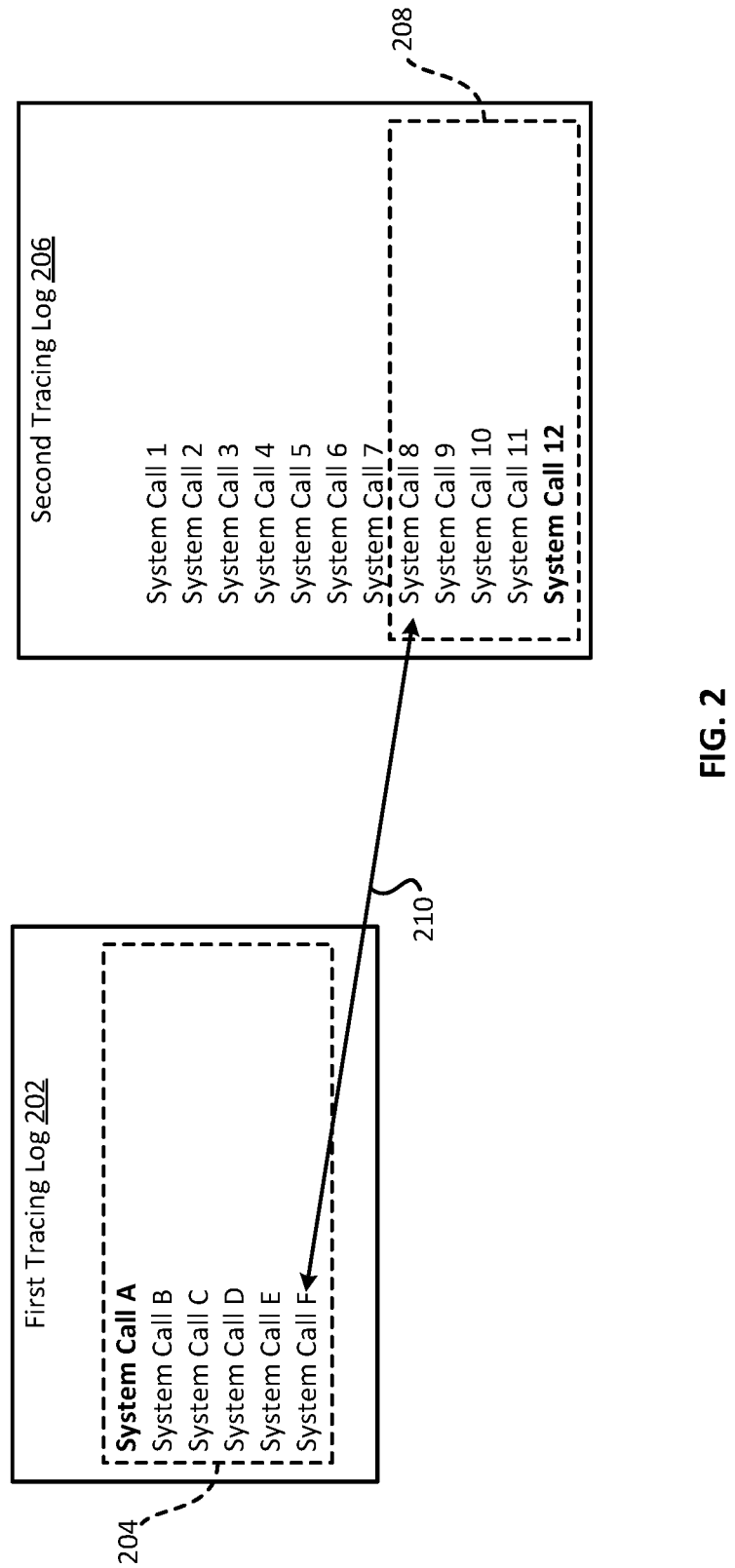
FIG. 2 is a block diagram of an example of a link between a first subsequence of system calls and a second subsequence of system calls according to some aspects of the present disclosure.

The troubleshooting software 116 can use any number and combination of techniques to analyze the tracing data 114 to determine the sequence of system calls 124. For example, the troubleshooting software 116 can analyze the parameters of the system calls described in the tracing data 114. The parameters can be intrinsic properties of the system calls and may exclude additional metadata associated with the system calls, such as timestamps associated with system calls. For example, the software service 132a can issue a first set of system calls to an operating system of node 104a, and the software service 132b can issue a second set of system calls to an operating system of node 104b. The system calls can be commands and the parameters can be command parameters, such as types, flags, and network addresses (e.g., IP address or URL) associated with the commands. By analyzing the parameters of the first set of system calls and the second set of system calls, the troubleshooting software 116 can identify links between the first set of system calls and the second set of system. A link between system calls can be a temporal relationship between the system calls. The troubleshooting software 116 can use the links to determine the sequence of system calls 124. This process is described later on in greater detail with respect to FIGS. 2-3.

After determining the sequence of system calls 124, the troubleshooting software 116 can then generate an output 120 indicating the sequence of system calls 124. In some examples, the troubleshooting software 116 can transmit the output 120 over a network (e.g., the Internet) to a user device 118 for display to the user 122. Examples of the user device 118 can include a laptop computer, desktop computer, mobile phone, tablet, or server. The output 120 may be provided to the user 120 as part of a graphical user interface (GUI) or a command-line output, in some examples. Providing the output 120 to the user 122 may allow the user 122 to better understand the execution sequence associated with the software services 132a-n, which in turn can help the user 122 debug the problem. For example, the user 122 may be able to determine a problematic software service, or determine that the software services are being executed in a problematic order, based on the output 120. This can help the user 122 identify a root cause of the problem.

In some examples, the troubleshooting software 116 can also identify one or more causes 126 of the problem based on the sequence of system calls 124. For example, the troubleshooting software 116 can determine that an error event occurred each time a software service 132a received a certain type of request from the client device 106 or each time the software service 132a made a certain type of system call. As a result, the troubleshooting software 116 can determine that the software services 132a has a defect that is the cause 126 of the problem. As another example, the troubleshooting software 116 may determine that an error event occurred when a subset of the software services 132a-n executed a particular subsequence of system calls. As a result, the troubleshooting software 116 may flag this subsequence of system calls, by the subset of software services, as the cause 126 of the problem. As still another example, the troubleshooting software 116 may determine that an error event occurred when a first subset of the software services 132a-n executed a sequence of system calls 124. The troubleshooting software 116 may also determine that the error event did not occur when a second subset of the software services 132a-n executed the same sequence of system calls 124. As a result, the troubleshooting software 116 can determine that the first subset of the software services 132a-n has a defect that is not present in the second subset of the software services 132a-n, where the defect is the cause 126 of the problem. It will be appreciated that any number and combination of techniques or rules can be used to identify the one or more causes 126. And since there may be multiple factors that contribute to the problem, in some examples the troubleshooting software 116 can identify multiple causes 126 that contribute to the problem. The troubleshooting software 116 can then include the one or more causes 126 of the problem in the output 120, to assist the user 122 in troubleshooting the problem.

In some examples, the troubleshooting software 116 may automatically assist in mitigating the problem, additionally or alternatively to providing the one or more causes 126 of the problem to the user 122 in the output 120. For example, the troubleshooting software 116 can determine and execute one or more mitigation operations based on the one or more causes 126 to help mitigate the problem. Examples of the mitigation operations can include disabling, updating, or rerouting network traffic around a software service (e.g., a problematic software service). Another example of the mitigation operations can include adjusting an order in which system calls are executed by the software services 132a-n (e.g., to avoid a problematic sequence of system calls). The troubleshooting software 116 can determine any number and combination of mitigation operations using any number and combination of techniques. For example, the troubleshooting software 116 may apply an algorithm or predefined rules to the one or more causes 126 to determine which mitigation operations to execute. The predefined rules may be default rules or more customized rules generated by the user 122, a software developer associated with the software services 132a-n, or a third party.

Although FIG. 1 shows a particular arrangement of components, other examples may include more components, fewer components, different components, or a different arrangement of the components shown in FIG. 1. For instance, another example can involve the troubleshooting software 116 being located on another node of the distributed computing environment 102, such as one of the nodes 104a-n executing the software services 132a-n, rather than on the centralized node 112.

As mentioned above, in some examples the troubleshooting software 116 can identify links between system calls executed by the software services 108a-n. One example of this process will now be described with respect to FIG. 2. In this example, the troubleshooting software can analyze tracing data from a first tracing log 202 associated with a first software service and a second tracing log 206 associated with a second software service to determine a link 210 between the system calls therein.

More specifically, the troubleshooting software can begin by analyzing the first tracing log 202 to identify a starting event therein. A starting event can be an event that triggers a series of system calls. An example of the starting event may be the opening of a port or a receipt of a request from a client device, as described above. In the example shown in in FIG. 2, the starting event can be system call A that triggers additional system calls B-F. The troubleshooting software can analyze the first tracing log 202 based on predefined rules to identify the starting event. The predefined rules may specify certain types of system calls as starting events.

Having determined a starting event in the first tracing log 202, the troubleshooting software can determine that the system calls B-F stem from system call A. System calls B-F can stem from system call A because they were directly or indirectly triggered by system call A. The troubleshooting software can determine that the system calls B-F stem from system call A based on the characteristics of some or all of the system calls A-F described in a tracing log. The characteristics of a system call can include its parameters, such as its type and flags; its metadata, such as a corresponding process identification number (PID) and timestamp; or any combination of these. The troubleshooting software can analyze the characteristics of the system calls A-F to determine relationships among system calls A-F, such as that system calls A-F are related to one another and temporally follow one another to form a first subsequence of system calls 204. The troubleshooting software may then store indicators of these relationships in a datastore (e.g., a file, array, or table) for subsequent use.

The troubleshooting software can also analyze the second tracing log 206 to identify a starting event therein. In the example shown in in FIG. 2, the starting event can be system call 8 that triggers additional system calls 9-12. The troubleshooting software can analyze the second tracing log 206 using any of the techniques described above to identify the starting event therein. Having determined a starting event in the second tracing log 206, the troubleshooting software can determine that the system calls 9-12 stem from system call 8 based on the characteristics of some or all of the system calls 8-12. The troubleshooting software can analyze the characteristics of the system calls 8-12 to determine relationships among system calls 8-12, such as that system calls 9-12 are related to one another and temporally follow one another to form a second subsequence of system calls 208. The troubleshooting software may then store indicators of these relationships in a datastore for subsequent use. The datastore may be the same as, or different from, the datastore associated with the first tracing log 202.

The first subsequence of system calls 204 can include at least one system call for interacting with the second software service. An example of such a system call can be system call F. System call F may be configured for connecting to, transmitting data to, or otherwise interacting with the second software service. For example, system call F may be configured for making a REST API call to the second software service, transmitting a D-Bus message to the second software service, or transmitting a file to the second software service. In some examples, the troubleshooting software can identify both sides of this interaction by analyzing the first tracing log 202 and the second tracing log 206. For example, the troubleshooting software can determine that system call F involves transmitting a communication request to the second software service and that system call 8 involves receiving the communication request from the first software service. Based on both of these system calls relating to the same communication, the troubleshooting software can determine that system call F and system call 8 are linked. This link 210 is represented by the double-sided arrow in FIG. 2. Having identified a link 210 and a temporal relationship between the first subsequence of system calls 204 and the second subsequence of system calls 208, the troubleshooting software can then determine an overall sequence of system calls that includes the first subsequence of system calls 204 occurring prior to the second subsequence of system calls 208. In the overall sequence of system calls, system call A can serve as an overall starting event and system call 12 can serve as an overall ending event.

While the above example is somewhat simplistic for illustrative purposes, the troubleshooting software can analyze any number of tracing logs to identify any number and combination of links and temporal relationships among any number and combination of subsequences of system calls made by any number and combination of software services, which may or may not be part of the same distributed computing environment. This may include analyzing multiple back-and-forth communications between two or more software services, where each communication may trigger the execution of a corresponding subsequence of system calls by a recipient software service, and where the troubleshooting software can follow these communications back-and-forth to link together the corresponding subsequences of system calls into an overall sequence of system calls.

A more specific example of the abovementioned process will now be described with respect to FIG. 3. FIG. 3 depicts examples of a first tracing log 302 associated with a first software service and a second tracing log 304 associated with a second software service. The first software service can interact with the second software service. In this example, the second software service may be a webserver configured to return webpage data to the first software service in response to receiving a hypertext transfer protocol (HTTP) request from the first software service.

The first tracing log 302 shows system calls made by the first software service, such as system calls for getting a socket name, receiving webpage data from the second software service, and writing log data to a log file. The second tracing log 304 shows system calls made by the second software service, such as system calls for accepting requests on a port, opening a hypertext markup language (HTML) file named index.html that includes the webpage data, writing log data about the connection request from the first software service to a server log, sending the webpage data to the first software service, and reading data.

In some examples, the troubleshooting software can analyze the tracing data in the first tracing log 302 and the second tracing log 304 to determine a link 306 between the two. For example, the troubleshooting software can analyze the first tracing log 302 and the second tracing log 304 to identify both sides of an HTTP interaction between the first software service and the second software service. In the example shown in FIG. 3, one side of the HTTP interaction involves the first software application making a system call (a "getsockname" system call) to create a network connection with an IP address (127.0.0.1) on a certain temporary port (67004), and the other side of the HTTP interaction involves the second software application making a system call (an "accept4" system call) to accept the network connection associated with the IP address on the temporary port. Both of these system calls are highlighted in FIG. 3 with dashed boxes. The troubleshooting software can determine a relationship among these system calls, namely that they form both sides of an HTTP connection between the two software services, by analyzing the parameters (e.g., the type, IP address, and port) of the highlighted system calls. Based on this relationship, the troubleshooting software can determine that a link 306 exists between these two sequences of system calls and store data indicative of the link 306 in a datastore. For example, the troubleshooting software can store mappings between (i) the log entries in the tracing data and (ii) unique labels assigned to unique sequences of events in the data store, where log entries associated with the same unique sequence of events can be assigned the same unique label. The troubleshooting software can perform a similar process for any number and combination of system calls executed by any number and combination of software services to determine any number and combination of links between the system calls.

As noted above, conventional logs (e.g., server logs) generally exclude system-call parameters and may only contain select information written thereto by the software services themselves. This limited amount of information may make it difficult or impossible to identify the abovementioned links. For example, with reference to FIG. 3, the first software service may generate a server log that only contains "hello world" as a result of the "write" system call shown in the first tracing log 302. And the second software service may generate a server log that only contains "127.0.0.1—[6 Sep. 2020 19:02:12] "GET/HTTP 1.1" 200—" as a result of the "write" system call shown in the second tracing log 304. Given this limited amount of data, it would be difficult or impossible to reliably and consistently identify a link between these two log events. But some examples of the present disclosure overcome this issue by using tracing data generated by software tracing tools, where the tracing data is more complete in that it includes information about system calls made by the software services.

Figure 4:
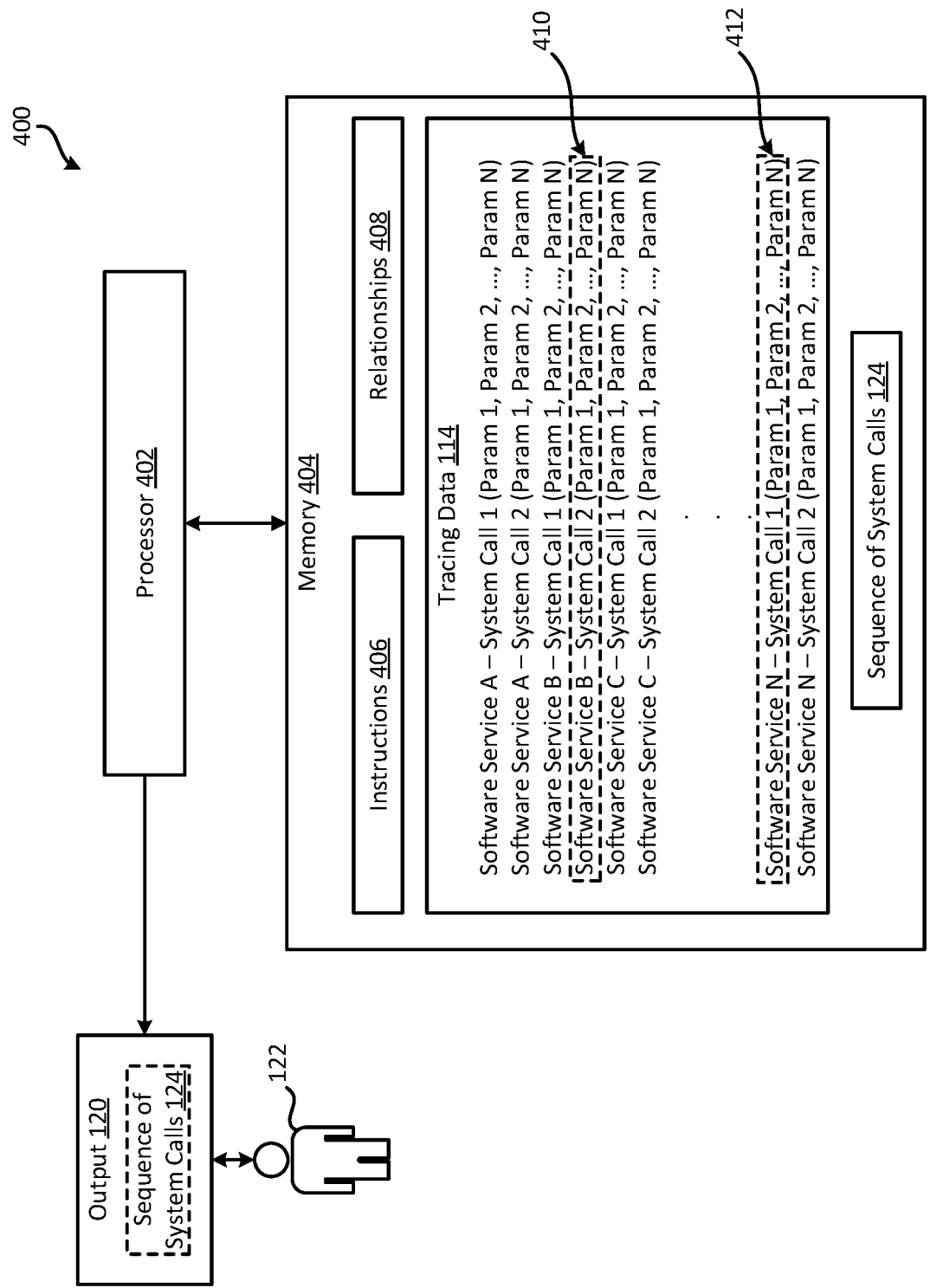
FIG. 4 is a block diagram of another example of a system for troubleshooting software services based on system calls according to some aspects of the present disclosure.

FIG. 4 is a block diagram of another example of a system 400 for troubleshooting software services based on system calls according to some aspects of the present disclosure. The system 400 includes a processor 402 communicatively coupled with a memory 404. In some examples, the processor 402 and the memory 404 can be part of the same computing device, such as the centralized node 112 of FIG. 1. In other examples, the processor 402 and the memory 404 can be distributed from (e.g., remote to) one another.

The processor 402 can include one processor or multiple processors. Examples of the processor 402 can include a Field-Programmable Gate Array (FPGA), an application-specific integrated circuit (ASIC), or a microprocessor. The processor 402 can execute instructions 406 stored in the memory 404 to perform operations. The instructions 406 may include processor-specific instructions generated by a compiler or an interpreter from code written in any suitable computer-programming language, such as C, C++, C#, etc.

The memory 404 can include one memory or multiple memories, which can be volatile and/or non-volatile. A non-volatile memory can include any type of memory that retains stored information when powered off. Examples of non-volatile memory can include flash memory and electrically erasable and programmable read-only memory (EEPROM). At least some of the memory 404 can include a non-transitory computer-readable medium from which the processor 402 can read instructions 406. A computer-readable medium can include electronic, optical, magnetic, or other storage devices capable of providing the processor 402 with computer-readable instructions or other program code. Examples of a computer-readable medium can include a magnetic disk, memory chip, ROM, random-access memory (RAM), an ASIC, a configured processor, optical storage, or any other medium from which a computer processor can read the instructions 406.

The processor 402 can execute instructions 406 to perform various operations. For example, the processor 402 can receive tracing data 114 indicating system calls executed by a plurality of software services. In the example shown in FIG. 4, the tracing data 114 indicates system calls executed by software services A-N, where each system call has parameters 1-N. These parameters are represented in the figure as "Param 1" through "Param N". It will be appreciated that although FIG. 4 only shows two system calls for each software service for simplicity, the tracing data 114 may specify any number and combination of system calls executed by any number and combination of software services, where each system call has any number and combination of parameters.

After receiving the tracing data 114, the processor 402 can analyze the parameters of the system calls described in the tracing data 114 to identify relationships 408 between the system calls. For example, the processor 402 may determine that a series of system calls all involve the same network address (e.g., IP address) and consequently that the series of system calls are related. As another example, the processor 402 may access predefined rules indicating that a first type of system call is related to a second type of system call. For instance, the predefined rules may specify that the second type of system call always follows the first type of system call. Based on the predefined rules, the processor 402 can identify the first type of system call and the second type of system call in the tracing data 114 and determine that the two system calls are related.

Based on the relationships 408 between the system calls, the processor 402 can determine a sequence of system calls 124 between a predefined starting event and a predefined ending event. Examples of the predefined starting event can be a particular system call, such as system call 410; receipt of a certain type of data from a client device, such as the receipt of a webpage request from a client device; or a particular system event, such as a software service, container, or virtual machine being deployed on a computing device. Examples of the predefined ending event can be a particular system call, such as system call 412; transmission of a certain type of data to a client device, such as the transmission of a response to a request from a client device; or a particular system event, such as an error event associated with the execution of one or more software services. In some examples, the predefined starting event and the predefined ending event may be selected by the user 122. For example, if the user 122 wishes to analyze a particular sequence of system calls that led to a problem, the user 122 may choose an appropriate starting event and an appropriate ending event to narrow down the amount of entries in the tracing data 114 that are to be analyzed by the processor 402. The user 122 may then input the selected starting event and/or ending event to the processor 402 via a graphical user interface or command-line interface.

After determining the sequence of system calls 124, the processor 402 can generate an output 120 to the user 122 indicating the sequence of system calls 124. For example, the processor 402 can transmit the output 120 to a user device of the user 122 over a network. The user device can receive the output 120 and display the output 120 on a display device, such as a liquid crystal display (LCD) or light-emitting diode (LCD) display. The output 120 can be used by the user 122 in troubleshooting a problem associated with an execution the plurality of software services. In some examples, the output 120 may take the form of a graphical user interface designed to aid the user in interpreting the sequence of system calls 124.

Figure 5:
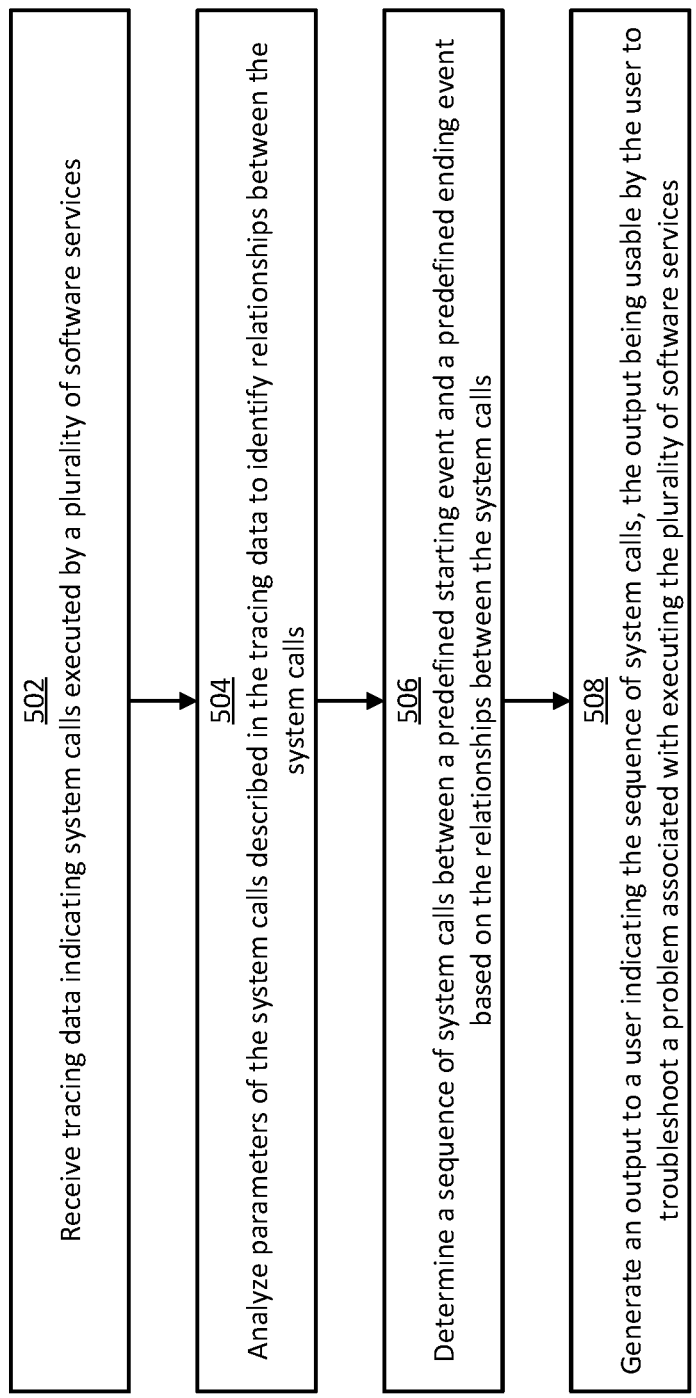
FIG. 5 is a flow chart of an example of a process for troubleshooting software services based on system calls according to some aspects of the present disclosure.

FIG. 5 is a flow chart of an example of a process for troubleshooting software services based on system calls according to some aspects of the present disclosure. Other examples can include more steps, fewer steps, different steps, or a different order of the steps than is shown in FIG. 5. The steps of FIG. 5 are discussed below with reference to the components discussed above in relation to FIG. 4.

In block 502, the processor 402 receives tracing data 114 indicating system calls executed by a plurality of software services. The processor 402 can receive the tracing data 114 from any suitable source, such as from a datastore or from the nodes that executed the software tracing tools to generate the tracing data 114.

In block 504, the processor 402 analyzes the parameters of the system calls described in the tracing data 114 to identify relationships 408 between the system calls. In some examples, the processor 402 may additionally or alternatively analyze other characteristics of the system calls to identify the relationships 408. For example, the processor 402 can analyze metadata associated with the system calls to identify the relationships 408. Examples of metadata associated with a system call may include a timestamp associated with the system call, a unique identifier of a process associated with the system call, or a unique identifier of user associated with the system call.

In block 506, the processor 402 determines a sequence of system calls 124 between a predefined starting event and a predefined ending event, based on the relationships 408 between the system calls. For example, the processor 402 can determine that the predefined starting event occurred at a first time and the predefined ending event occurred at a second time. The processor 402 can then determine a sequence of system calls 124 that occurred between the first time and the second time, where the system calls in the sequence are related to one another according to the relationships 408.

In block 508, the processor 402 generates an output 120 to the user 122 indicating the sequence of system calls 124. The output 120 can be used by the user 122 in troubleshooting a problem associated with executing the plurality of software services. For example, the user 122 can view the output 120 to identify which sequence of system calls caused the problem and better understand how the system calls in the sequence are interrelated to troubleshoot the problem.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions that are executable by the processor for causing the processor to:
      receive tracing data indicating system calls executed by a plurality of software services;
      analyze the tracing data to detect a first system call that is associated with a predefined starting event;
      analyze the tracing data to detect a second system call that is associated with a predefined ending event;
      after detecting the first system call and the second system call in the tracing data, analyze the tracing data to determine a subset of the system calls between the first system call and the second system call;
      after determining the subset of the system calls between the first system call and the second system call, analyze parameters of the subset of the system calls to determine relationships between the subset of the system calls, the parameters being different than timestamps of the subset of the system calls;
      determine a sequence of the subset of the system calls based on the determined relationships between the subset of the system calls; and
      generate an output for a user indicating the sequence of the subset of the system calls, the output being usable by the user to troubleshoot a problem associated with executing the plurality of software services.

2. The system of claim 1, wherein the tracing data is generated by one or more software tracing tools that are distinct from the plurality of software services.

3. The system of claim 1, wherein the plurality of software services are located on a plurality of computing devices that are separate from one another and communicatively coupled to one another via a network, and wherein the tracing data includes a plurality of tracing logs that correspond to the plurality of software services.

4. The system of claim 3, wherein the memory further includes instructions that are executable by the processor for causing the processor to:
   analyze a first tracing log of the tracing data to determine a first subsequence of the system calls executed by a first software service of the plurality of software services, the first subsequence of the system calls including the first system call associated with the predefined starting event;
   analyze a second tracing log of the tracing data to determine a second subsequence of the system calls executed by a second software service of the plurality of software services, the second tracing log being separate from the first tracing log, the second subsequence of the system calls occurring subsequent to the first subsequence of the system calls, and the second subsequence of the system calls including the second system call associated with the predefined ending event;
   determine a link between the first subsequence of the system calls and the second subsequence of the system calls based on a correlation between a first parameter of the first subsequence of the system calls and a second parameter of the second subsequence of the system calls; and
   determine, based on the link, that the sequence of the subset of the system calls includes the first subsequence of the system calls followed by the second subsequence of the system calls.

5. The system of claim 1, wherein the predefined starting event and the predefined ending event are selectable by the user.

6. The system of claim 1, wherein the memory further includes instructions that are executable by the processor for causing the processor to determine a cause of the problem based on the determined sequence of the subset of the system calls, and wherein the output indicates the cause of the problem to enable the user to mitigate the problem.

7. The system of claim 1, wherein the memory further includes instructions that are executable by the processor for causing the processor to:
   determine, based on the sequence of the subset of the system calls, that the problem is caused by a particular software service among the plurality of software services; and
   automatically mitigate the problem by (i) disabling the particular software service, (ii) updating the particular software service, or (iii) rerouting network traffic around the particular software service.

8. A method comprising:
   receiving, by a processor, tracing data indicating system calls executed by a plurality of software services;
   analyzing, by the processor, the tracing data to detect a first system call that is associated with a predefined starting event;
   analyzing, by the processor, the tracing data to detect a second system call that is associated with a predefined ending event;
   after detecting the first system call and the second system call in the tracing data, analyzing, by the processor, the tracing data to determine a subset of the system calls between the first system call and the second system call;

after determining the subset of the system calls between the first system call and the second system call, analyzing, by the processor, parameters of the subset of the system calls to determine relationships between the subset of the system calls, the parameters being different than timestamps of the subset of the system calls;

determining, by the processor, a sequence of the subset of the system calls based on the determined relationships between the subset of the system calls; and generating, by the processor, an output for a user indicating the sequence of the subset of the system calls, the output being usable by the user to troubleshoot a problem associated with executing the plurality of software services.

9. The method of claim 8, wherein the tracing data is generated by one or more software tracing tools that are distinct from the plurality of software services.

10. The method of claim 8, wherein the plurality of software services are located on a plurality of computing devices that are separate from one another and communicatively coupled to one another via a network, and wherein the tracing data includes a plurality of tracing logs that correspond to the plurality of software services.

11. The method of claim 8, further comprising:
analyzing a first tracing log of the tracing data to determine a first subsequence of the system calls executed by a first software service of the plurality of software services, the first subsequence of the system calls including the first system call associated with the predefined starting event;
analyzing a second tracing log of the tracing data to determine a second subsequence of the system calls executed by a second software service of the plurality of software services, the second tracing log being separate from the first tracing log, the second subsequence of the system calls occurring subsequent to the first subsequence of the system calls, and the second subsequence of the system calls including the second system call associated with the predefined ending event;
determining a link between the first subsequence of the system calls and the second subsequence of the system calls based on a correlation between a first parameter of the first subsequence of the system calls and a second parameter of the second subsequence of the system calls; and
determining, based on the link, that the sequence of the subset of the system calls includes the first subsequence of the system calls followed by the second subsequence of the system calls.

12. The method of claim 8, wherein the predefined starting event and the predefined ending event are selectable by the user.

13. The method of claim 8, further comprising:
determining, by the processor, a cause of the problem based on the determined sequence of the subset of the system calls, and wherein the output indicates the cause of the problem to enable the user to mitigate the problem.

14. The method of claim 8, further comprising:
determining, by the processor and based on the sequence of the subset of the system calls, that the problem is caused by a particular software service among the plurality of software services; and automatically mitigating, by the processor, the problem by (i) disabling the particular software service, (ii) updating the particular software service, or (iii) rerouting network traffic around the particular software service.

15. A non-transitory computer-readable medium comprising program code that is executable by a processor for causing the processor to:
receive tracing data indicating system calls executed by a plurality of software services;
analyze the tracing data to detect a first system call that is associated with a predefined starting event;
analyze the tracing data to detect a second system call that is associated with a predefined ending event, the second system call being after the first system call in the tracing data;
after detecting the first system call and the second system call in the tracing data, analyze the tracing data to determine a subset of the system calls between the first system call and the second system call;
after determining the subset of the system calls between the first system call and the second system call, analyze parameters of the subset of the system calls to determine relationships between the subset of the system calls, the parameters being different than timestamps of the subset of the system calls;
determine a sequence of the subset of the system calls based on the determined relationships between the subset of the system calls; and
generate an output for a user indicating the sequence of the subset of the system calls, the output being usable by the user to troubleshoot a problem associated with executing the plurality of software services.

16. The non-transitory computer-readable medium of claim 15, further comprising program code that is executable by the processor for causing the processor to:
analyze a first tracing log of the tracing data to determine a first subsequence of the system calls executed by a first software service of the plurality of software services, the first subsequence of the system calls including the first system call associated with the predefined starting event;
analyze a second tracing log of the tracing data to determine a second subsequence of the system calls executed by a second software service of the plurality of software services, the second tracing log being separate from the first tracing log, the second subsequence of the system calls occurring subsequent to the first subsequence of the system calls, and the second subsequence of the system calls including the second system call associated with the predefined ending event;
determine a link between the first subsequence of the system calls and the second subsequence of the system calls based on a correlation between a first parameter of the first subsequence of the system calls and a second parameter of the second subsequence of the system calls, wherein the first parameter and the second parameter are not timestamps; and
determine, based on the link, that the sequence of the subset of the system calls includes the first subsequence of the system calls followed by the second subsequence of the system calls.

* * * * *